United States Patent Office 3,578,681
Patented May 11, 1971

3,578,681
SYNTHESIS OF THIOXANE
Clifford H. Mihm, deceased, late of Borger, Tex., by Adeline M. Mihm, administratrix, Borger, Tex., assignor to Phillips Petroleum Company
No Drawing. Filed Nov. 1, 1968, Ser. No. 773,978
Int. Cl. C07d 89/14
U.S. Cl. 260—327                                              3 Claims

ABSTRACT OF THE DISCLOSURE

Thioxane is synthesized by reaction of beta-mercaptoethanol and 1,2-ethanedithiol employing a silicone catalyst. The silicone catalyst is a silicone rubber or grease on a solid support disposed in a column.

---

This invention relates to the synthesis of thioxane. In one of its aspects the invention relates to synthesis of thioxane employing a catalyst. In another of its aspects, the invention relates to the synthesis of thioxane by reaction of beta-mercaptoethanol and 1,2-ethanedithiol.

According to one of its concepts the invention provides a process for the synthesis of thioxane by engendering reaction between beta-mercaptoethanol and 1,2-ethanedithiol in the presence of a silicone rubber catalyst. In another of its concepts the invention provides a process for synthesizing thioxane, as described, by passing beta-mercaptoethanol and 1,2-ethanedithiol through a reaction column in which the silicone rubber catalyst such as Silicone GE-52, supported on Gas Pak W has been disposed. According to a still further concept of the invention, in lieu of, or in addition to, the silicone rubber, a silicone grease such as Dow Corning high vacuum grease, can be employed. Still further, according to a concept of the invention, thioxane is synthesized by passing the reactants through an extended column such as a chromatographic analysis column at an elevated temperature.

It has now been discovered that thioxane is formed by reaction of beta-mercaptoethanol and 1,2-ethanedithiol when these reactants are placed in the presence of each other under reaction conditions in the presence of a catalyst such as a silicone rubber or a silicone grease.

More specifically, it has been discovered in utilizing such a material that is herein described to be catalytic for the reaction to form thioxane from beta-mercaptoethanol and 1,2-ethanedithiol in chromatographic analysis work that whereas neither of the said reactants shows other than a clean peak, that is, a peak without shoulders for the said reactant or component that when blended and run on the same column a large shoulder peak appears on the leading edge of the beta-mercaptoethanol and a new peak can be shown to account for the loss in the beta-mercaptoethanol and 1,2-ethanedithiol peaks from the calculated blend composition.

It is an object of this invention to provide a process for the synthesis of thioxane. It is another object of this invention to provide a reaction between beta-mercaptoethanol and 1,2-ethanedithiol. It is a further object of this invention to engender a reaction between beta-mercaptoethanol and 1,2-ethanedithiol to form thioxane. It is another object of this invention to provide a catalyst for the reaction of beta-mercaptoethanol and 1,2-ethanedithiol. It is a still further object of the invention to provide a catalyst for causing a reaction between beta-mercaptoethanol and 1,2-ethanedithiol to form thioxane.

Other aspects, concepts and objects, the several advantages of the invention are apparent from a study of this disclosure and the appended claims. According to the present invention thioxane is formed by the reaction of beta-mercaptoethanol and 1,2-ethanedithiol in the presence of a catalyst which is at least one of a silicone of rubber or grease.

EXAMPLE I

A blend of 50%–50% beta-mercaptoethanol and 1,2-ethanedithiol was prepared. Actual weight percentages were beta-mercaptoethanol 49.61 wt. percent and 1,2-ethanedithiol 50.39 wt. percent. Correcting for purities of the feedstocks (neither contained the other) gave beta-mercaptoethanol 49.48 percent and 1,2-ethanedithiol 49.46 percent. This blend was then run through a 4-meter Ucon LB–5500X on Gas Pak W and a 9-foot silicone rubber on Gas Pak W column. The results were as follows:

|  | Blend | 4-meter U CON | 9-foot silicone rubber |
|---|---|---|---|
| Lights | | 0.88 | 0.3 |
| BME | 49.48 | 49.42 | 40.7 |
| 1,2 EDT | 49.46 | 49.64 | 43.8 |
| Heavies | | 0.06 | |
| Thioxane | | | 16.9 |
| Total | 100.00 | 100.00 | |
| Column conditions: | | | |
| Temperature, °F | | 419 | 307 |
| Time, minutes | | 12 | [1] 9.5 |

[1] Maximum.

From the foregoing example, it is quite clear that no reaction took place in the 4-meter Ucon column even though temperature was higher and potential reaction time was considerably longer. A 6-percent loss of EDT and a 9-percent loss of BME and a gain of 16.9 percent thioxane occurred in the silicone rubber column. The difference between 15 percent loss of BME and gain of about 17 percent which were measured was due to the production of thioxane which, on the chromatogram showed up as a shoulder on the BME peak.

It will be noted that both chromatograph columns which were used contained Gas Pak W as solid support for the catalyst. Accordingly, it does not appear that Gas Pak W alone is a catalyst.

EXAMPLE II

Another 50–50 blend of BME and 1,2 EDT was placed in a small jar and suspended in a boiling water bath. A small piece about the size of a small pea of silicone grease was added to the blend. This mixture was held at 207° F. for one hour and 15 minutes. Following this a sample was withdrawn and run through a chromatograph. The column used was a 12-foot Carbowax on Teflon and results were as follows:

| Lights | 1.31 | |
| --- | --- | --- |
| BME | 50.75 | Gain 1.29 from 49.46 in blend.[1] |
| 1,2 EDT | 47.94 | Loss 1.54 from 49.48 in blend. |

[1] Refer to Example I.

The gain of BME and the loss of EDT is accounted for by the formation of thioxane.

EXAMPLE III

Sulfolane was substituted for the water bath and the blend and silicone grease and the mixture held at 255° F. for 2½ hours. Again a sample was withdrawn and analyzed on the chromatograph. This time the 4-meter Ucon column was used. The results were as follows:

| Lights | 0.79 | |
| --- | --- | --- |
| BME | 51.53 | Loss 2.00 from 49.64 in blend. |
| 1,2 EDT | 47.64 | Gain 2.11 from 49.46 in blend. |
| Heavies | 0.04 | |
| Total | 100.00 | |

It is evident from Example III that silicone grease as well as silicone rubber will catalyze reaction of BME and 1,2 EDT to form thioxane.

It is apparent from the foregoing that a concept of the invention is in the finding or discovery that a silicone rubber and/or a silicone grease will catalyze the reaction set out which can be represented as follows:

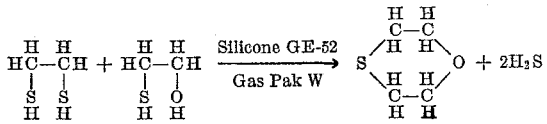

One skilled in the art in possession of this disclosure having studied the same and the concepts therein, as set forth, will know the specific silicone rubber (GE–52) and the specific silicone grease (Dow Corning high vacuum grease) which is now available and will be able to determine by mere routine test other functionally equivalent rubbers and greases.

"Silicone Gum Rubber-Phenyl Methyl—GE SE–52." Silicone gum rubber is discussed in U.S. Pat. 2,448,565, issued Sept. 7, 1948, James G. E. Wright and Curtis S. Oliver, as being pure silicone before compounding with fillers, vulcanizers, etc. A patent covering phenyl methyl silicone is U.S. Pat. 2,258,222, issued Oct. 7, 1941, Eugene G. Rochow, column 2, page 1, line 24 to column 1, page 2, line 55. "An Introduction to the Chemistry of the Silicones" by Rochow discusses methyl aryl silicones, and specifically, methyl phenyl silicone, which are included within the scope of this disclosure.

A silicone grease used in the invention is Dow Corning high vacuum grease. It is known as a stopcock grease. Pages 87, 90, and 91 of McGregor on "Silicones and Their Uses," 1954, show that stopcock greases are silicone compounds of dimethyl silicones and a few percent of a very finely divided silica. Reference 71 on page 87 is to U.S. Pat. 2,428,608, issued Oct. 7, 1947, Shailer L. Bass. In the patent see column 3, line 15 to column 5, line 10. The grease is pure silica and silicone and contains no fillers, etc. The disclosures of the several references here mentioned are incorporated by reference.

Further, in lieu of the proportions used in the examples herein as may be desired, one skilled in the art in possession of this disclosure having studied the same can employ proportions substantially within the approximate range of 5/1 to 1/5 mole ratios of the respective reactants. The now preferred mole ratio of the reactants is approximately 1:1.

While herein in the examples certain types of equipment and conditions have been set forth, it is clear that one skilled in the art having possession and having studied this disclosure can provide other equipment and conditions under which to perform the reaction of the invention with a catalyst according to the invention. In lieu of the column, other reaction equipment can be selected as indeed is indicated by Example II. Further, the reaction can be conducted batch-wise or in a continuous manner as one skilled in the art having possession of this disclosure and having studied the same can readily visualize and construct.

It is evident from the examples that a fairly broad range of reaction temperatures can be used. Indeed, it is now evident that a temperature in the range from about 150° F. to about 400° F. can be employed. The pressure in the column or other reaction vessels will be in the range of about atmospheric pressure to about 100 pounds per square inch.

Temperatures and pressures outside the given range are within the broader concept of the invention which is the reaction with the recited kind of catalyst.

Gas Pak W is a trade name for 50–60 mesh diatomaceous earth which can be obtained from Chemical Research Services, Inc. of Addison, Ill. In lieu of Gas Pak other catalyst adjuvants or support can be used.

Reasonable variation and modification are possible within the scope of the foregoing disclosure and the appended claims to the invention the essence of which is that it has been discovered that a silicone rubber and/or a silicone grease will catalyze at an elevated temperature a reaction between beta-mercaptoethanol and 1,2-ethanedithiol to form thioxane.

What is claimed is:

1. A process for the preparation of thioxane which comprises inducing a reaction between beta-mercaptoethanol and 1,2-ethanedithiol by heating the same at least until a reaction has been induced in the presence of at least one of a silicone rubber and a silicone grease.

2. A process according to claim 1 wherein the reaction is effected at a temperature in the range of from about 150° F. to about 400° F.

3. A reaction according to claim 1 wherein the pressure during the reaction is maintained within the approximate range of from about atmospheric pressure to about 100 pounds per square inch.

References Cited

Reid, Org. Chem. of Bivalents, vol. III (Chem. Pub. Co., Inc., New York, 1960), pp. 74–7.

HENRY R. JILES, Primary Examiner

C. M. SHURKO, Assistant Examiner